US010538216B2

(12) United States Patent
White et al.

(10) Patent No.: US 10,538,216 B2
(45) Date of Patent: Jan. 21, 2020

(54) AIRBAG TRIM COVER FOR ROOF RAILS OF A VEHICLE

(71) Applicant: FORD GLOBAL TECHNOLOGIES, LLC, Dearborn, MI (US)

(72) Inventors: John Q. White, Livonia, MI (US); John A. Stakoe, Bloomfield Hills, MI (US); Michael T. Feiten, Farmington, MI (US); William C. Bauer, Canton, MI (US); Robert R. Armitage, Howell, MI (US); James A. Stec, Flat Rock, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 160 days.

(21) Appl. No.: 15/865,352

(22) Filed: Jan. 9, 2018

(65) Prior Publication Data
US 2019/0210552 A1    Jul. 11, 2019

(51) Int. Cl.
*B60R 21/213* (2011.01)
*B60R 21/215* (2011.01)
*B60R 21/00* (2006.01)

(52) U.S. Cl.
CPC .......... *B60R 21/215* (2013.01); *B60R 21/213* (2013.01); *B60R 2021/0083* (2013.01); *B60R 2021/21537* (2013.01)

(58) Field of Classification Search
CPC ................ B60R 21/213; B60R 21/215; B60R 2021/21537; B60R 2021/0083
USPC ............................................. 280/730.1, 730.2
See application file for complete search history.

(56) References Cited

U.S. PATENT DOCUMENTS

| | | | |
|---|---|---|---|
| 5,540,459 A | 7/1996 | Daniel | |
| 6,126,192 A | 10/2000 | Enders | |
| 6,439,598 B1* | 8/2002 | Braun | B60R 21/213 280/728.2 |
| 7,931,295 B2* | 4/2011 | Inui | B60R 13/025 280/728.2 |
| 9,302,642 B2 | 4/2016 | Faruque et al. | |
| 2001/0022441 A1* | 9/2001 | Nakajima | B60R 21/213 280/730.2 |
| 2001/0040361 A1* | 11/2001 | Tajima | B60N 2/879 280/728.2 |
| 2002/0125705 A1 | 9/2002 | Wong et al. | |
| 2004/0094938 A1* | 5/2004 | Ryu | B60R 21/213 280/730.2 |
| 2004/0256843 A1* | 12/2004 | Totani | B60R 21/213 280/730.2 |
| 2005/0029780 A1* | 2/2005 | Tanase | B60R 13/0225 280/730.2 |
| 2005/0052001 A1* | 3/2005 | Totani | B60N 2/58 280/728.2 |
| 2006/0138763 A1 | 6/2006 | Brady | |

(Continued)

FOREIGN PATENT DOCUMENTS

WO    2017042829 A1    3/2017

*Primary Examiner* — Toan C To
(74) *Attorney, Agent, or Firm* — Vichit Chea

(57) ABSTRACT

A vehicle apparatus comprises an airbag secured to a roof rail of a vehicle and a trim cover. The trim cover has a base member fastened to the roof rail, a flap member, and a living hinge integrally molded between the base and flap members. The flap member rotates on the hinge when the airbag deploys. The flap member also, in a covering position, has a distal edge fastenerlessly clipped to the vehicle.

15 Claims, 4 Drawing Sheets

(56) References Cited

U.S. PATENT DOCUMENTS

| | | | | |
|---|---|---|---|---|
| 2006/0261580 | A1* | 11/2006 | Tiesler | B60R 21/213 |
| | | | | 280/730.2 |
| 2008/0303251 | A1* | 12/2008 | Sato | B60R 13/0206 |
| | | | | 280/730.2 |
| 2016/0167614 | A1* | 6/2016 | Inami | B60R 13/0206 |
| | | | | 280/730.2 |

\* cited by examiner

AIRBAG TRIM COVER FOR ROOF RAILS OF A VEHICLE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to interior trim covers for vehicles and, more specifically, to a trim cover for an airbag mounted to a roof rail of a vehicle.

A vehicle commonly includes a roof. For some vehicles, such as sport utility vehicles, the roof may be removable from the vehicle. When the roof is removed, the vehicle may be driven in an open air environment—i.e., a passenger space of the vehicle is directly exposed to any conditions in which the vehicle is present. For example, the passenger space may be exposed to inclement weather, extreme temperatures, and dust or dirt.

Horizontal roof rail assemblies support the roof when it is installed on the vehicle. The roof rails, in turn, are supported by vertical pillar structures. Typically, the roof rail assemblies include energy absorbing material, such as foam, for occupant safety. Alternatively, side curtain airbags may be provided as part of the roof rail assemblies. Once deployed, the airbags typically obstruct visibility for the driver. This can render the vehicle undrivable in an off road environment where assistance may not be readily available. Furthermore, any trim covers for the airbags in the roof rail assemblies would need to withstand the conditions present in the open air environment. Thus, it would be desirable to have weatherproof trim covers for the airbags that allow the airbags to be concealed after deployment while achieving low component costs and simple, reliable assembly to the vehicle.

SUMMARY OF THE INVENTION

The invention includes a trim cover for an airbag mounted to a roof rail of a vehicle. The trim cover has a base member fastened to the roof rail, a flap member with a distal edge, and a hinge between the base and flap members. When the flap member is in a covering position, the airbag is concealed from view, the distal edge is fastenerlessly clipped to the vehicle, and there is an acute angle between the base and flap members.

The airbag deploys from a cavity between the flap member and the roof rail. When the airbag deploys, the force of the airbag deploying releases the distal edge from the vehicle. After the distal edge releases from the vehicle, the flap member rotates on the hinge from the covering position to a deployed position. When the airbag has deployed into a passenger space of the vehicle, the flap member is in the deployed position.

After the airbag has deployed, the airbag is deflated and can be manually returned to the cavity behind the flap member. The flap member is then rotated back to the concealing position and the distal edge reclipped to the vehicle. When the distal edge is reclipped, the deflated airbag is concealed from view.

The base member may be fastened to the roof rail by a suitable fastener. For example, the base member may be fastened to the roof rail by a screw or a clip tower.

The distal edge of the flap member may form a one-sided clip. The one-sided clip projects from a backside surface of the flap member. The one-sided clip may be adapted to mate with the roof rail or with a pillar structure supporting the roof rail.

The trim cover may be molded from a weatherproof material such as polypropylene. The hinge may be formed during molding of the trim cover. The hinge may be a living hinge integrally molded in the trim cover between the base and flap members.

DETAILED DESCRIPTION OF PREFERRED EMBODIMENTS

Figure 1:
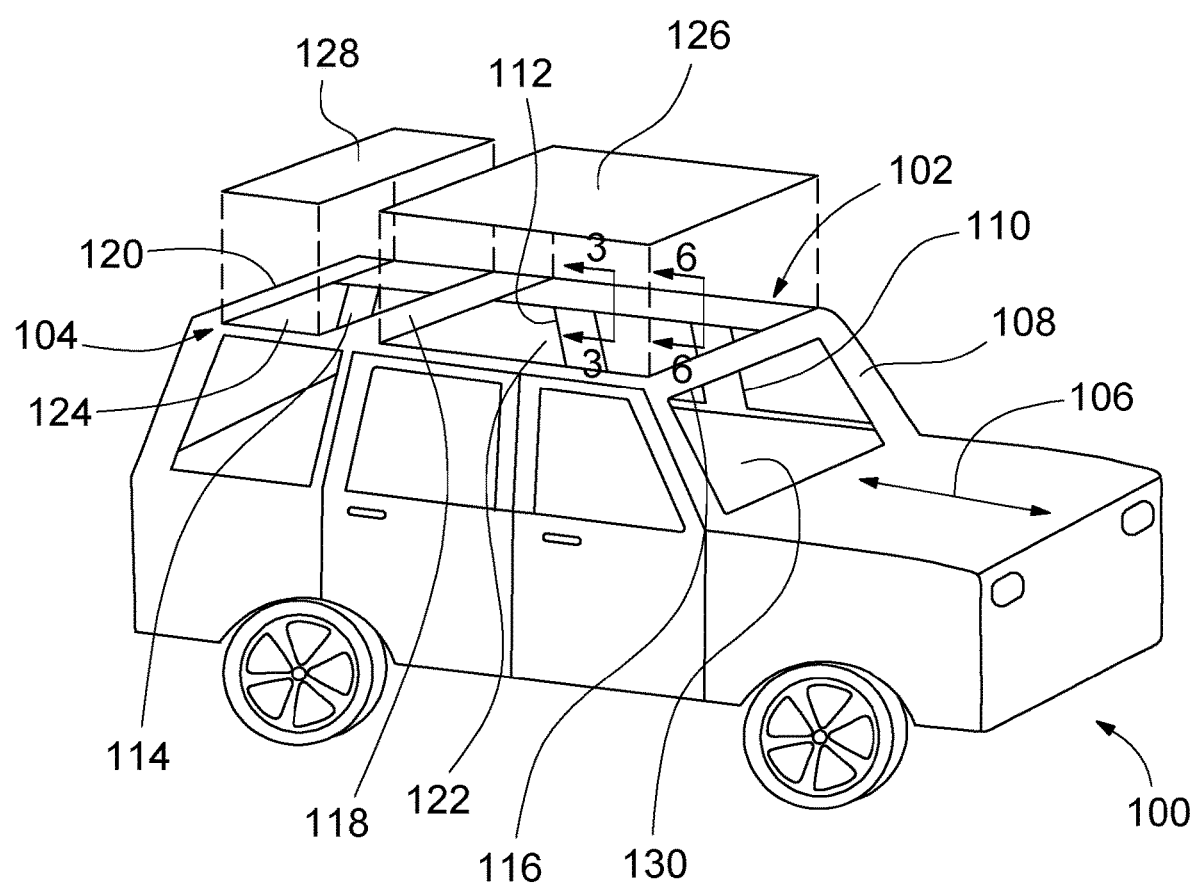
FIG. 1 is a schematic perspective view showing a vehicle having trim covers according to the present invention.

Referring now to FIG. 1, there is illustrated a vehicle, indicated generally at 100. Although illustrated as a four door, sport utility type vehicle, the vehicle 100 may be any other type of vehicle. As non-limiting examples, the vehicle 100 may be a two door vehicle or may be a van, sedan, or truck. The vehicle 100 has left and right roof rail assemblies, indicated generally at 102 and 104 respectively. Discussion of one of the left or right roof rail assemblies 102 or 104, respectively, also applies to the other of the left or right roof rail assemblies 102 or 104, unless otherwise noted.

As illustrated, the left and right roof rail assemblies 102 and 104, respectively, extend horizontally along a longitudinal axis 106 of the vehicle 100. The longitudinal axis 106 is a front to rear centerline of the vehicle 100. Furthermore, the left and right roof rail assemblies 102 and 104, respectively, are symmetric across the longitudinal axis 106. Alternatively, the left and right roof rail assemblies 102 and 104, respectively, may extend other than along the longitudinal axis 106 and/or be other than symmetric across the longitudinal axis 106. Alternatively, the vehicle 100 may have more or less than the two roof rail assemblies illustrated.

As illustrated, the left roof rail assembly 102 is supported on vertical first, second, third, and fourth pillar structures 108, 110, 112, and 114, respectively. The first, second, third, and fourth pillar structures 108, 110, 112, and 114, are typically identified as the A-pillar, B-pillar, C-pillar, and D-pillar, respectively. Alternatively, the left roof rail assembly 102 may be supported by more or less than the four pillar structures illustrated. The right roof rail assembly 104 is similarly supported on vertical pillar structures.

Furthermore, as illustrated, the left and right roof rail assemblies 102 and 104, respectively, are connected by horizontal first, second, and third cross rail structures 116, 118, and 120, respectively. As illustrated, the first, second, and third cross rail structures 116, 118, and 120, respectively, are perpendicular to the left and right roof rail assemblies 102 and 104, respectively. Alternatively, the first, second, and third cross rail structures 116, 118, and 120, respectively, may be other than perpendicular to one or both of the left and right roof rail assemblies 102 and 104, respectively. Alternatively, the left and right roof rail assemblies 102 and 104, respectively, may be connected by more or less than the three cross rail structures illustrated.

The left and right roof rail assemblies 102 and 104, respectively, and the first and second cross rail structures 116 and 118, respectively, define a first roof opening 122. Similarly, the left and right roof rail assemblies 102 and 104, respectively, and the second and third cross rail structures 118 and 120, respectively, define a second roof opening 124. The first and second roof openings 122 and 124, respectively, are for removable roof assemblies. Alternatively, the vehicle 100 may have more or less than the two roof openings illustrated. For example, the second roof opening 124 may be omitted and replaced by a non-removable roof.

A first roof assembly 126 may be selectively installed or uninstalled—i.e., removed—from the first roof opening 122. Similarly, a second roof assembly 128 may be selectively installed or uninstalled from the second roof opening 124. Discussion of one of the first or second roof assemblies 126 or 128, respectively, is also applicable to the other of the first or second roof assemblies 126 or 128, respectively, unless otherwise noted.

In FIG. 1, the first and second roof assemblies 126 and 128, respectively, have been uninstalled such that the vehicle 100 is configured for driving in an open air environment. In the open air environment, a passenger space 130 inside the vehicle 100 is directly exposed through the first and second roof openings 122 and 124, respectively, to any environmental conditions in which the vehicle 100 is present. The vehicle 100 may also include a cargo space exposed through the first and second roof openings 122 and 124, respectively, to the environmental conditions. As non-limiting examples, the passenger space 130 may be exposed to inclement weather, extreme temperatures, and dust or dirt. Alternatively, the first and second roof assemblies 126 and 128, respectively, may be installed in the first and second roof openings 122 and 124, respectively, to configure the vehicle 100 for driving as a non-open air environment. In the non-open air environment, the passenger space 130 is not directly exposed through the first and second roof openings 122 and 124, respectively, to the environmental conditions in which the vehicle 100 is present.

When the one or both of the first and second roof assemblies 126 and 128, respectively, are uninstalled, the left and right roof rail assemblies 102 and 104, respectively, remain installed and in place on the vehicle 100.

Figure 2:
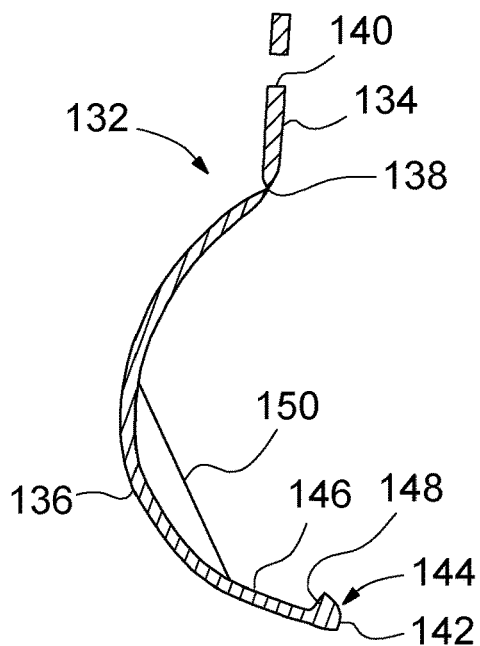
FIG. 2 is a section view of a trim cover according to an embodiment of the present invention.

Referring now to FIG. 2, there is illustrated an as molded trim cover, indicated generally at 132, for use with the left and right roof rail assemblies 102 and 104, respectively. FIG. 2 is a typical section view of the as molded trim cover 132.

The trim cover 132 includes a base member 134 and a flap member 136. The base and flap members 134 and 136, respectively, are connected by a hinge 138 that allows the base and flap members 134 and 136, respectively, to rotate relative to each other. Preferably, when the trim cover 132 is installed on the vehicle 100, the hinge 138 extends along the longitudinal axis 106 for a length of the trim cover 132. Alternatively, the hinge 138 may extend other than along the longitudinal axis 106.

Preferably, the hinge 138 is a living hinge formed when the trim cover 132 is molded from a material such as polypropylene. When the hinge 138 is a living hinge, the base member 134 and the flap member 136 are one molded piece, wherein the hinge 138 is molded with a thinner cross section than the base member 134 and the flap member 136 to create the hinge 138 as the living hinge. As a non-limiting example, the trim cover 132 may be injection molded. During the injection molding, the flap member 136 may be positioned over the base member 134 along the hinge 138.

The base member 134 preferably includes at least one fastener hole 140. The at least one fastener hole 140 is for fastening the base member 134 to the left or right roof rail assembly 102 or 104, respectively. The fastener hole 140 will be discussed further with reference to FIG. 3. Alternatively, the base member 134 may be fastened to the left or right roof rail assembly 102 or 104, respectively, by a clip.

A distal edge 142 of the flap member 136 is opposite the hinge 138. As illustrated, the distal edge 142 has a fastenerless clip, indicated generally at 144. The fastenerless clip 144 clips, attaches, mates, or otherwise secures the flap member 136 to the vehicle 100 to prevent rotation on the flap member 136 on the hinge 138.

As illustrated, the fastenerless clip 144 is a one-sided clip that projects from a backside surface 146 of the flap member 136. The one-sided clip is preferably integrally formed with the trim cover 132. Alternatively, the one-sided clip may be a separate piece that is joined to the flap member 136. The illustrated fastenerless clip 144 has a catch surface 148 generally perpendicular to the backside surface 146. Alternatively, the distal edge 142 may have other than the illustrated fastenerless clip 144. The distal edge 142 may have any structure suitable to secure the flap member 136 to the vehicle 100.

The trim cover 132 is preferably fabricated from a water- or weatherproof material. As discussed, the trim cover 132 is preferably molded from polypropylene. As illustrated, the trim cover 132 is fabricated with a reinforcing rib 150 to provide stiffness to the flap member 136. Alternatively, the rib 150 may be omitted or additional reinforcing ribs or structure may be included.

Figure 3:
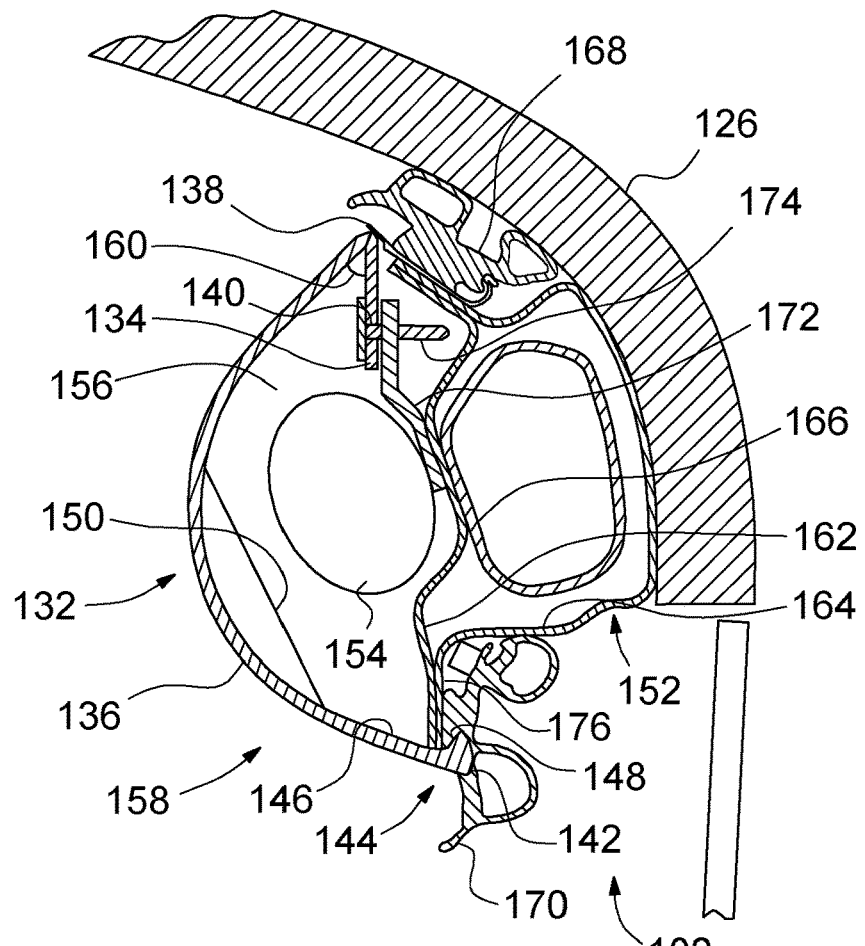
FIG. 3 is a first section view taken along line 3-3 of FIG. 1 showing the trim cover of FIG. 2 having a flap member in a covering position and an undeployed airbag.

Referring now to FIG. 3, there is illustrated the trim cover 132 installed on the left roof rail assembly 102. Discussion of the trim cover 132 in regards to the left roof rail assembly 102 also applies to the right roof rail assembly 104, unless otherwise noted. The trim cover 132 installed on the right roof rail assembly 104 is preferably vertically symmetric to FIG. 3.

Also illustrated in FIG. 3 are a roof rail, indicated generally at 152, and an airbag 154. The roof rail 152 is part of the left roof rail assembly 102 and the airbag 154 is mounted or otherwise secured to the roof rail 152 in a cavity 156. The cavity 156 is defined between the trim cover 132 and the roof rail 152. As a non-limiting example, the airbag 154 is a side curtain airbag. In FIG. 3, the flap member 136 is in a covering position 158 in which the undeployed airbag 154 is concealed from view. In the covering position 158, an angle 160 between the base and flap members 134 and 136, respectively, is acute.

The roof rail 152 extends along and supports the left roof rail assembly 102. In turn, the roof rail 152 is supported by the first, second, third, and fourth pillar structures 108, 110, 112, and 114, respectively. Preferably, the roof rail 152 is a rigid member fabricated from a material such as steel or aluminum, but may be fabricated from other materials as well.

As illustrated, the roof rail 152 comprises inner, outer, and core structures 162, 164, and 166, respectively. The inner and outer structures 162 and 164, respectively, are joined together and the core structure 166 is joined to the inner structure 162. As non-limiting examples, the inner, outer, and core structures 162, 164, and 166, respectively, may be welded, bolted, screwed, or otherwise joined together. Alternatively, the roof rail 152 may have a configuration or structure other than as illustrated.

Also provided for the left roof rail assembly 102 are first and second gaskets 168 and 170, respectively. The first gasket 168 provides a seal with the first roof assembly 126 when the first roof assembly 126 is installed in the first roof opening 122. The second gasket 170 provides a seal with upper door sheet metal or a door window.

Attached to the inner structure 162 is a bracket 172. As non-limiting examples, the bracket 172 may be welded, bolted, or screwed to the inner structure 162. As illustrated, the trim cover 132 and airbag 154 are fastened to the bracket 172. The bracket 172 may be continuous along the rail 152 or may be one of a plurality of brackets spaced along the length of the rail 152. Alternatively, the bracket 172 may be omitted. When the bracket 172 is omitted, the trim cover 132 and airbag 154 may be fastened directly to the left roof rail assembly 102—e.g., the inner structure 162. Alternatively, the airbag 154 may be fastened to the bracket 172 and the trim cover 132 fastened directly to the left roof rail assembly 102 or vice versa.

The base member 134 is fastened to the bracket 172 by a fastener 174 in the fastener hole 140. As illustrated, the fastener 174 is a screw. Alternatively, the fastener 174 may be other than a screw. As non-limiting examples, the fastener 174 may be a bolt, rivet, or, as will be discussed with reference to FIG. 6, a clip tower.

As illustrated, the flap member 136 is secured to the vehicle 100 by the fastenerless clip 144. The fastenerless clip 144 is secured to a flange 176 of the outer structure 164. The fastenerless clip 144 is secured to the flange 176 by clipping over and engaging the flange 176 with the catch surface 148. As illustrated, the catch surface 148 is directly in contact with the flange 176. Alternatively, trim or other covering materials may be provided between the catch surface 148 and flange 176. Alternatively, additional parts or structure may be provided between the fastenerless clip 144 and the roof rail 152. As such, FIG. 3, in addition to showing the flap member 136 in the covering position 158 (in which the airbag 154 is concealed), also shows the fastenerless clip 144 in a clipping position in which the fastenerless clip 144 is engaged with the flange 176.

As illustrated, the trim cover 132 is installed on the left roof rail assembly 102 such that the hinge 138 is positioned vertically above the distal edge 142 in the vehicle 100. Alternatively, the trim cover 132 may be installed on the left roof rail assembly 102 such that the hinge 138 and distal edge 142 are positioned other than as illustrated in FIG. 3. As a non-limiting example, the trim cover 132 may be installed on the left roof rail assembly 102 such that the hinge 138 is positioned vertically below the distal edge 142.

Figure 4:
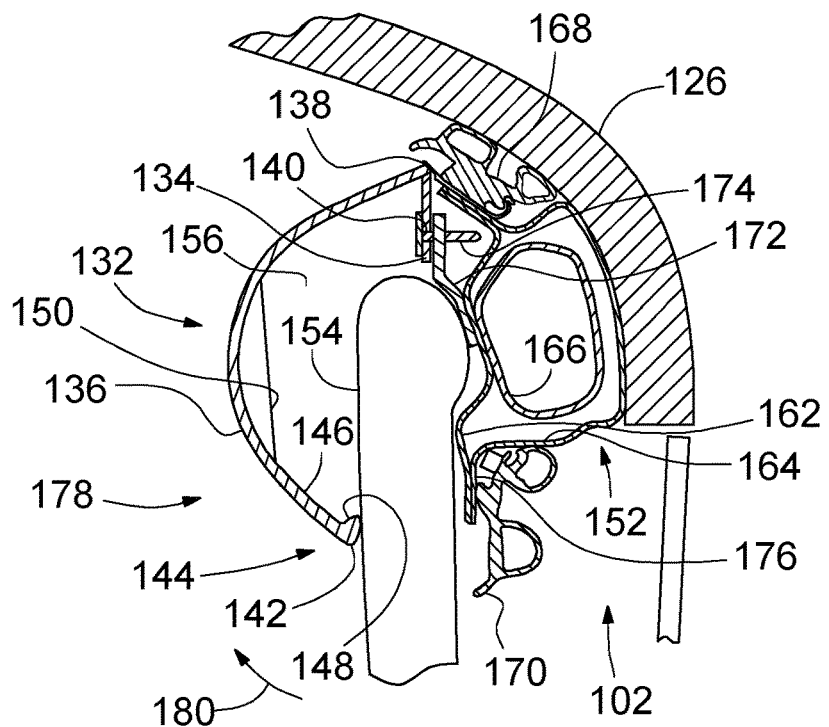
FIG. 4 is a second section view taken along line 3-3 of FIG. 1 showing the trim cover of FIG. 2 having the flap member in a deployed position and a deployed airbag.

Referring now to FIG. 4, there is illustrated the airbag 154 deployed and the flap member 136 rotated on the hinge 138 to a deployed position, indicated generally at 178. The deployed position 178 may have the flap member 136 rotated on the hinge 138 more or less than as illustrated in FIG. 4. As a non-limiting example, the flap member 136 may rotate to contact the first roof assembly 126. Furthermore, the deployed airbag 154 may be other than as illustrated. As a non-limiting example, the airbag 154 may have a different size and/or shape than as illustrated.

The airbag 154 deploys from the cavity 156 and into the passenger space 130. The deployed airbag 154 may have a shape other than as illustrated. The airbag 154 has deployed—i.e., inflated—with sufficient force to release the fastenerless clip 144 from the left roof rail assembly 102—i.e., the catch surface 148 releases and disengages from the flange 176 when the airbag 154 deploys.

The fastenerless clip 144 is selectively operable between the clipping position (shown in FIG. 3) and a release position (shown in FIG. 4) in which the fastenerless clip 144 is released from the flange 176. The fastenerless clip 144 may be tuned to adjust a minimum force magnitude for release from the flange 176 by the airbag 154 deploying. With the fastenerless clip 144 released, the deploying airbag 154 rotates the flap member 136 on the hinge 138 in a release direction 180. The flap member 136 rotates on the hinge 138 from the covering position 158 to the deployed position 178. As discussed, the deploying airbag 154 may rotate the flap member 136 further in the release direction 180 than shown in FIG. 4. Once the airbag 154 has competed inflating, the flap member 136 may then fall back toward the deployed position 178 shown in FIG. 4.

Figure 5:
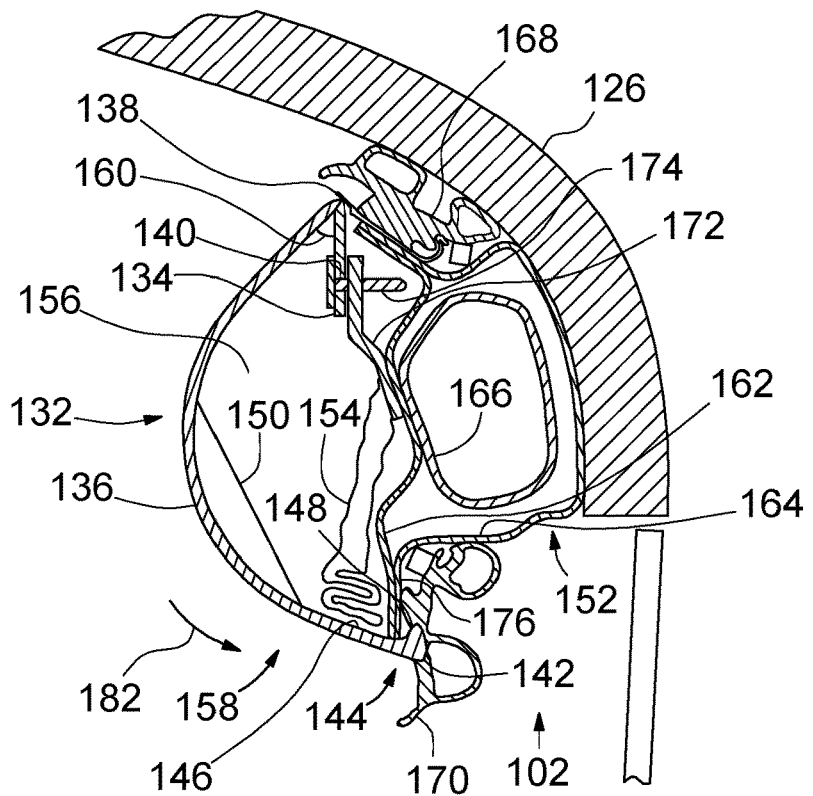
FIG. 5 is a third section view taken along line 3-3 of FIG. 1 showing the trim cover of FIG. 2 having the flap member in a covering position and a deflated airbag.

Referring now to FIG. 5, the flap member 136 has been returned to the covering position 158 after the airbag 154 is deflated and stored in the cavity 156. With the deflated airbag 154 stored in the cavity 156, the flap member 136 has been rotated on the hinge 138 in a concealment direction 182. The flap member 136 rotates in the concealment direction 182 from the deployed position 178 to the covering position 158. The flap member 136 may be fabricated such that its own weight rotationally biases the flap member 136 towards the covering position 158. The fastenerless clip 144 is again reclipped or secured to the outer structure 164 to hold the flap member 136 in the covering position 158—i.e., the catch surface 148 is reengaged with the flange 176. With the fastenerless clip 144 engaged with the flange 176, the flap member 136 holds the deflated airbag 154 concealed in the cavity 156.

Figure 6:
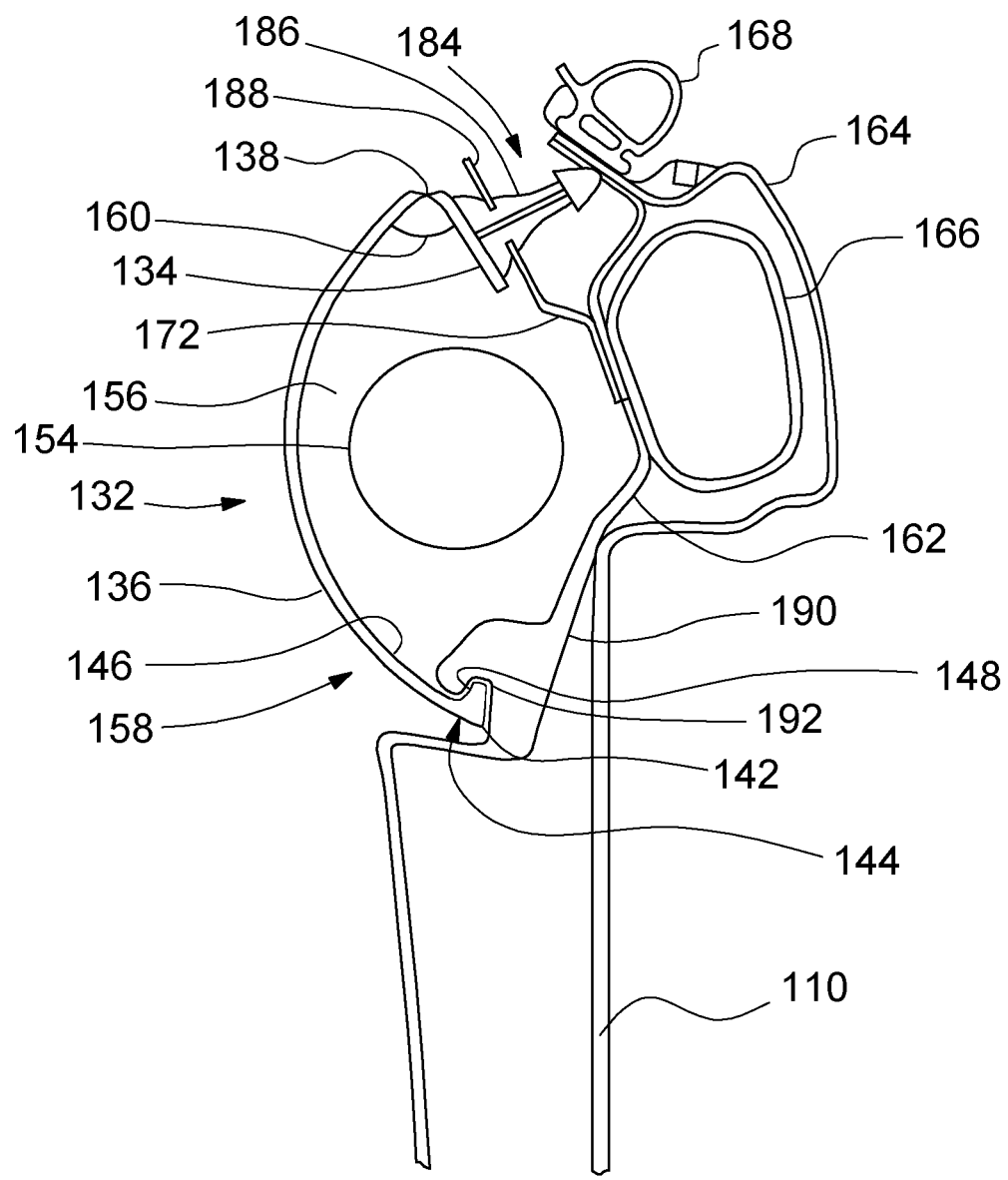
FIG. 6 is a partial section view taken along line 6-6 of FIG. 1 and having a trim cover according to another embodiment of the present invention.

Referring now to FIG. 6, there is illustrated the base member 134 having a clip tower, indicated generally at 184, for fastening the base member 134 to the bracket 172. Preferably, the clip tower 184 is formed with the base member 134 such that the clip tower 184 projects or otherwise protrudes from the base member 134. Alternatively, the clip tower 184 may be a separate part joined or otherwise secured to the base member 134. The clip tower 184 has a plurality of radially extending arms 186 that engage with a backside 188 of the bracket 172 to fasten the base member 134 to the bracket 172.

Furthermore, in FIG. 6, the fastenerless clip 144 clips or otherwise engages with an upper portion 190 of the second structural pillar 110. The fastenerless clip 144 engages with a slot 192 in the second structural pillar 110. As a non-limiting example, the slot 192 may be of a "tongue-in-groove" type.

In accordance with the foregoing, a trim cover for an airbag mounted to a roof rail of a vehicle has been described having significant advantages over the prior art. The trim covers conceal the deflated airbag after deployment to restore visibility for the vehicle.

What is claimed is:
1. A trim cover for a roof rail of a vehicle, the trim cover comprising:

a base member adapted to be fastened to the roof rail;
a flap member;
a living hinge integrally molded between the base and flap members, wherein the flap member has a distal edge carrying a fastenerless clip of the flap member to releasably attach the distal edge to a rigid structure of the vehicle which is separate from the trim cover while in a covering position that is adapted to conceal an air bag secured to the roof rail in a space behind the flap member, wherein the fastenerless clip is adapted to disengage from the rigid structure in response to an inflation force during deployment of the air bag to rotate the flap member about the living hinge, and wherein the fastenerless clip is adapted to manually re-clip to the rigid structure after a deployed air bag is manually returned to the space behind the flap member.

2. The trim cover of claim 1 wherein the fastenerless clip is comprised of a one-sided clip integrally formed in the distal edge and adapted to mate with a pillar structure supporting the roof rail.

3. The trim cover of claim 1 wherein the fastenerless clip is comprised of a one-sided clip integrally formed in the distal edge and adapted to mate with the roof rail.

4. The trim cover of claim 1 further comprising:
a clip tower projecting from the base member and adapted for fastening the base member to the roof rail.

5. The trim cover of claim 1 wherein an acute angle is between the base and flap members when the flap member is in the covering position.

6. The trim cover of claim 1 wherein the trim cover is molded from a weatherproof material.

7. A vehicle apparatus comprising:
an airbag secured to a roof rail of a vehicle;
a trim cover having:
 a base member fastened to the roof rail;
 a flap member;
 a living hinge integrally molded between the base and flap members, wherein the flap member *has a distal edge carrying a fastenerless clip of the flap member to releasably attach the distal edge to a rigid structure of the vehicle apparatus which is separate from the trim cover while in a covering position that is adapted to conceal the airbag in a space behind the flap member, wherein the fastenerless clip is adapted to disengage from the rigid structure in response to an inflation force to rotate the flap member about the living hinge when the airbag deploys and wherein the fastenerless clip is adapted to manually re-clip to the rigid structure after a deployed air bag is manually returned to the space behind the flap member.

8. The vehicle apparatus of claim 7 wherein the base member is fastened to the roof rail by a screw.

9. The vehicle apparatus of claim 7 wherein the base member is fastened to the roof rail by a clip tower.

10. The vehicle apparatus of claim 7 wherein the distal edge is adapted to mate with a pillar structure supporting the roof rail.

11. The vehicle apparatus of claim 7 wherein the distal edge is adapted to mate with the roof rail.

12. The vehicle apparatus of claim 7 wherein the fastenerless clip is comprised of a one-sided clip integrally formed in the distal edge.

13. The vehicle apparatus of claim 7 further comprising:
a bracket to which the base member is fastened and the airbag is secured, wherein the bracket is attached to the roof rail.

14. The vehicle apparatus of claim 7 wherein the trim cover is molded from a weatherproof material.

15. The vehicle apparatus of claim 7 wherein the trim cover is molded from polypropylene.

* * * * *